March 4, 1930.  G. C. ST. LOUIS  1,749,047
AIRPLANE
Filed Oct. 9, 1928
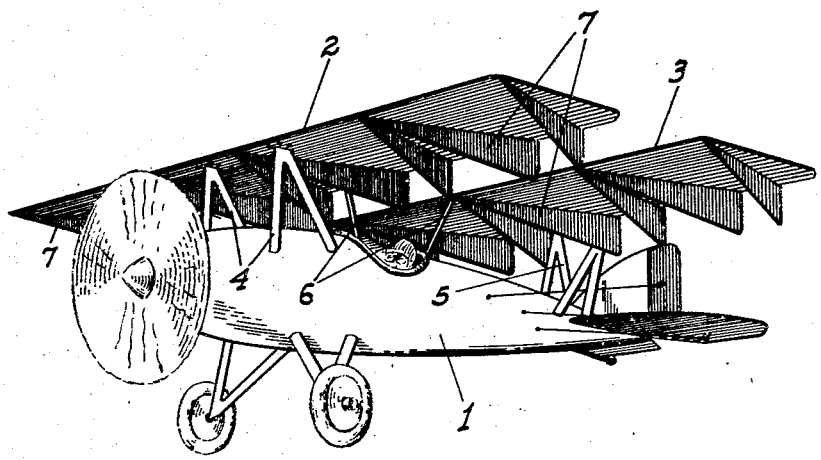
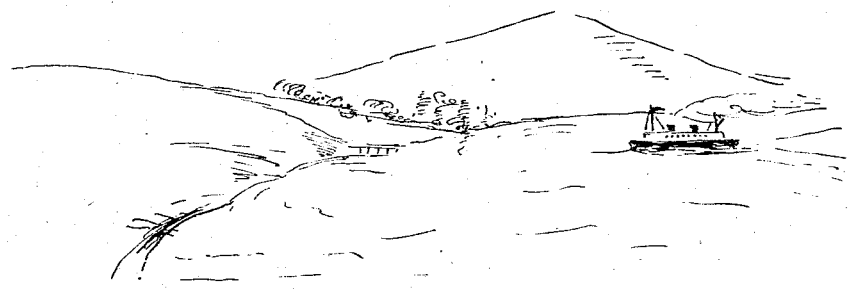
INVENTOR
George C. St Louis
BY
ATTORNEY Patented Mar. 4, 1930

1,749,047

UNITED STATES PATENT OFFICE

GEORGE C. ST. LOUIS, OF FRESNO, CALIFORNIA

AIRPLANE

Application filed October 9, 1928. Serial No. 311,290.

This invention relates to airplanes and particularly to the wing structure; my principal object being to construct a wing so that it incorporates the advantages of surface lifting wings as shown in my Patent No. 1,685,888, dated October 2, 1928, and filed June 18, 1927, under Serial No. 199,817, together with the air compression lifting features shown in my Patent No. 1,195,290, dated August 2nd, 1916; so as to provide a more efficient structure than was had with either of the above mentioned devices alone.

A further object of the invention is to produe a simple and inexpensive device and yet one which will be exceedingly effective for the purpose for which it is designed.

These objects I accomplish by means of such structure and relative arrangement of parts as will fully appear by a perusal of the following specification and claims.

The figure on the drawing is a fanciful perspective view of my improved airplane in flight.

Referring now more particularly to the characters of reference on the drawing, the airplane is preferably of the form shown in the first mentioned patent and comprises essentially a fuselage 1 having longitudinally spaced wing elements 2 and 3 of suitable construction; the front wing 2 being hingedly supported by vertical struts 4 at its forward end, while the wing 3 is similarly supported by vertical struts 5 at its rear end. The rear end of the front wing and the front end of the rear wing are connected by opposed and vertically movable rods 6, connected together in common at their lower ends to a control mechanism, as shown in said first named previous patent, and which enables the angle of setting of both wings to be altered simultaneously and in opposite directions. This particular structure however forms no part of the present invention and the wings may be rigidly attached to the fuselage in the usual manner if desired.

Rigidly secured to and depending from the under surface of each wing are longitudinally extending air deflecting plates 7. These plates are triangular in form, extending from the front to the rear edge of the wing and they slope downwardly and rearwardly from their apex at the forward edge of the wing.

These plates are arranged in cooperating pairs, those of each pair diverging from each other from front to rear and meeting each other at the forward edge of the wing as plainly shown.

By reason of this arrangement all the air as passing under the wing between the cooperating pairs of plates will be gradually deflected laterally and compressed until by the time the air reaches the rear edge of the wing it is compressed to such an extent that it is capable of exerting a much greater lifting effect on the wing than is the case with a plain surfaced wing alone. It is therefore possible to make the wings much smaller than is ordinarily the case, while still having the same or even greater lifting effect. The triangular form of deflecting plates permits the air pressure to be built up gradually, promoting easy and steady lifting into the air and not interfering with the steering or banking of the plane.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In an airplane, a wing, and air compressing plates secured to and depending from the under surface of the wing in planes at right angles thereto, and arranged in pairs; the plates of each pair diverging from each other to the rear edge of the wing, and meeting each other at the front edge of the wing.

2. In an airplane, a wing, and air compressing plates secured to and depending from the under surface of the wing in planes at right angles thereto, said plate being of triangular form and diverging from each other to the rear edge of the wing, and their lower edges sloping downward from the front edge of the wing to the rear edge thereof.

In testimony whereof I affix my signature.

GEORGE C. ST. LOUIS.